(12) United States Patent
Fort et al.

(10) Patent No.: US 8,006,526 B2
(45) Date of Patent: Aug. 30, 2011

(54) STEERING SHAFT LOCK ACTUATOR

(75) Inventors: William H. Fort, Stratham, NH (US); Knight Ko, Quincy, MA (US)

(73) Assignee: Stoneridge Control Devices, Inc., Canton, MA (US)

(*) Notice: Subject to any disclaimer, the term of this patent is extended or adjusted under 35 U.S.C. 154(b) by 693 days.

(21) Appl. No.: 11/741,656

(22) Filed: Apr. 27, 2007

(65) Prior Publication Data
US 2008/0028806 A1 Feb. 7, 2008

Related U.S. Application Data

(60) Provisional application No. 60/745,755, filed on Apr. 27, 2006.

(51) Int. Cl.
*B60R 25/02* (2006.01)
(52) U.S. Cl. ............................. 70/186; 70/252
(58) Field of Classification Search ............ 70/182–186, 70/252
See application file for complete search history.

(56) References Cited

U.S. PATENT DOCUMENTS

| | | | | |
|---|---|---|---|---|
| 1,369,782 A | * | 3/1921 | Catterson | 70/185 |
| 1,407,273 A | * | 2/1922 | Haskin | 70/287 |
| RE16,612 E | * | 5/1927 | Hershey | 70/252 |
| 4,232,537 A | * | 11/1980 | Plaiss | 70/233 |
| 4,576,024 A | * | 3/1986 | Weber | 70/252 |
| 4,658,610 A | * | 4/1987 | Weber | 70/252 |
| 4,771,618 A | * | 9/1988 | Weber et al. | 70/185 |
| 4,776,189 A | * | 10/1988 | Weber et al. | 70/182 |
| 5,730,010 A | * | 3/1998 | Norimatsu et al. | 70/186 |
| 6,076,382 A | * | 6/2000 | Naganuma | 70/186 |
| 6,539,756 B2 | * | 4/2003 | Bartels et al. | 70/186 |
| 6,889,532 B2 | * | 5/2005 | Fukushima | 70/185 |
| 7,412,858 B2 | * | 8/2008 | Tsukano et al. | 70/186 |
| 2004/0007030 A1 | | 1/2004 | Zillman | |
| 2004/0107750 A1 | | 6/2004 | Fukushima | |
| 2004/0250577 A1 | | 12/2004 | Watanuki et al. | |
| 2005/0223761 A1 | * | 10/2005 | Okuno et al. | 70/186 |
| 2005/0268677 A1 | * | 12/2005 | Okada et al. | 70/186 |

(Continued)

FOREIGN PATENT DOCUMENTS

DE 102004001511 8/2005

(Continued)

OTHER PUBLICATIONS

International Search Report and Written Opinion dated Aug. 25, 2008 issued in related International Patent Application No. PCT/US2007/067706.

(Continued)

*Primary Examiner* — Lloyd A Gall
(74) *Attorney, Agent, or Firm* — Grossman, Tucker, Perreault & Pfleger, PLLC

(57) ABSTRACT

A steering shaft lock actuator including at least one motor having an output shaft; a drive train coupled to the output shaft, a locking pawl coupled to the drive train; and a housing for at least partially enclosing the motor, the drive train, the locking pawl and the locking pin. The drive train may be configured to linearly urge the locking pawl and a locking pin between a locked position wherein the locking pawl and the locking pin extend at least partially out of the housing and unlocked position wherein the locking pawl and the locking pin are retracted toward the housing relative to the locked position. The locking pawl may be positioned to prevent rotational movement of the steering shaft when in the locked position. The locking pin may be positioned to lock the actuator to a steering shaft interface when in the locked position.

20 Claims, 15 Drawing Sheets

U.S. PATENT DOCUMENTS

2006/0021398 A1 2/2006 Hasegawa et al.
2006/0021399 A1* 2/2006 Hasegawa ..................... 70/186

FOREIGN PATENT DOCUMENTS

EP 1029755 8/2000

OTHER PUBLICATIONS

Examination Report dated Nov. 30, 2010 issued in related Application No. GB0819615.6.

* cited by examiner

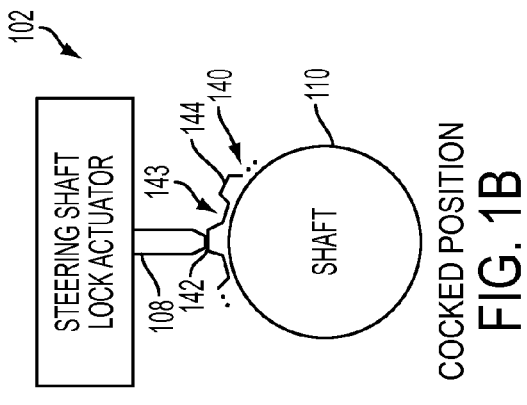
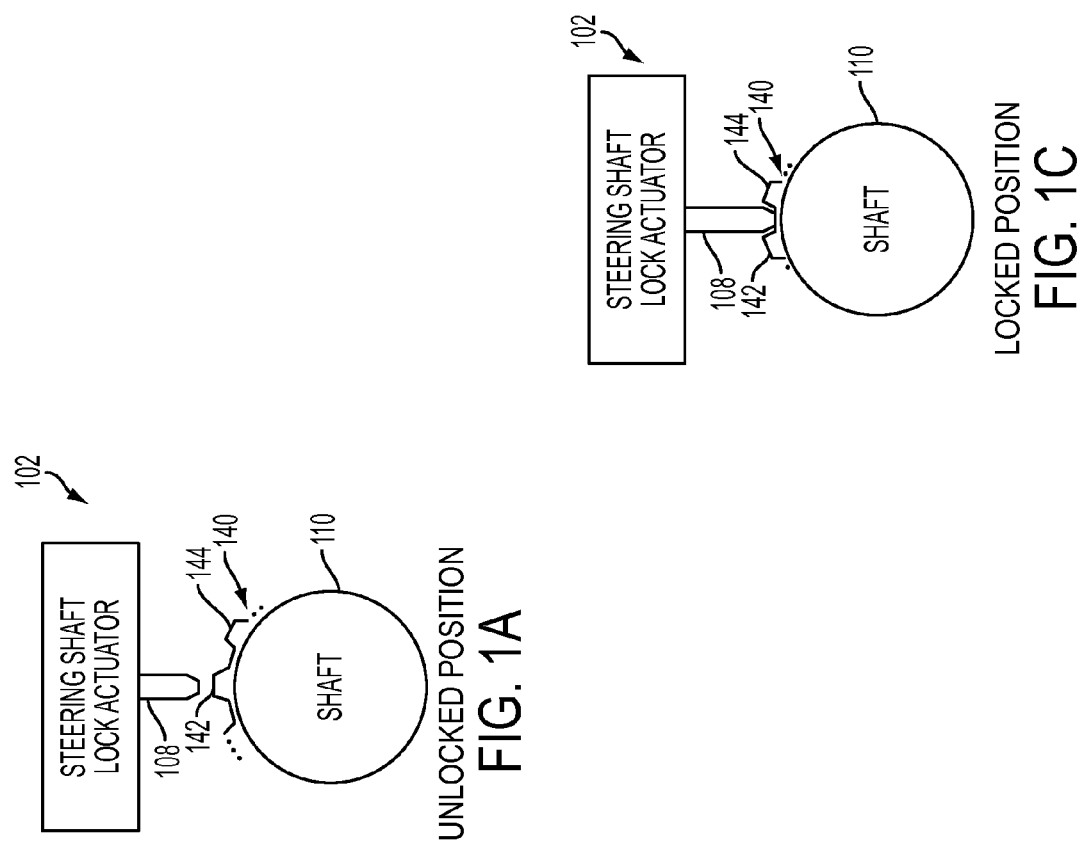

STEERING SHAFT LOCK ACTUATOR

CROSS-REFERENCE TO RELATED APPLICATIONS

This application claims the benefit of the filing date of U.S. Provisional Patent Application Ser. No. 60/745,755, filed Apr. 27, 2006, the teachings of which are hereby incorporated herein by reference.

TECHNICAL FIELD

This disclosure relates to steering shaft lock actuators for locking the steering shaft of a vehicle when the vehicle is not in use.

BACKGROUND

In the automotive industry, it may be desirable provide an anti-theft feature by locking the steering shaft of a vehicle to prevent rotation of the steering shaft when the vehicle ignition is off and the key is removed. Known systems utilize a keyed ignition system incorporated into the steering column. When the key is removed from the ignition, a mechanical steering shaft lock mechanism incorporated into the ignition switch may be actuated to lock the steering shaft in place. Other vehicles utilize a keyless system or a system where the keyed ignition system is not associated with steering column. For these configurations, an actuator that is not mechanically part of an ignition switch may be used to lock and unlock the steering shaft.

In one known steering shaft lock actuator, a locking member may be moved by the actuator from an unlocked to a locked position. When in the locked position, the locking member may engage a recess in the steering shaft to lock the steering shaft. The recess may be formed by adjacent teeth/splines of a toothed/splined ring that may be coupled to the steering shaft. An obstruction, e.g., a tooth of the toothed ring, may be encountered as the actuator attempts to drive the locking member to the locked position. The actuator motor may remain energized so that the motor drives the locking member to the locked position when the obstruction is removed. This can stress the motor and lead to early failure of the actuator. Actuator failure may be manifested in a failure of to lock the steering shaft when the vehicle is not in use and/or inadvertent locking of the steering shaft during normal driving conditions, which, of course, may pose a critical safety hazard.

Separately, it may be desirable that safeguards be provided to ensure that the steering shaft is never locked inadvertently, e.g. when the vehicle is moving. It may be further desirable, that an actuator configured for locking the steering shaft be configured to prevent facile removal when in the locked condition to provide anti-theft protection.

A system and method is needed that provides one or more of these features in a simple, reliable and/or cost-effective manner.

BRIEF DESCRIPTION OF THE DRAWINGS

Features and advantages of embodiments of the disclosed subject matter will become apparent as the following Detailed Description proceeds, and upon reference to the Drawings, where like numerals depict like parts, and in which:

FIG. 1A is a block diagram of a steering shaft lock actuator in an unlocked position with its locking member retracted;

FIG. 1B is a block diagram of the steering shaft lock actuator in a cocked position;

FIG. 1C is a block diagram of the steering shaft lock actuator in a locked position with its locking member fully extended once the obstruction of FIG. 1B is removed;

Figure 2:
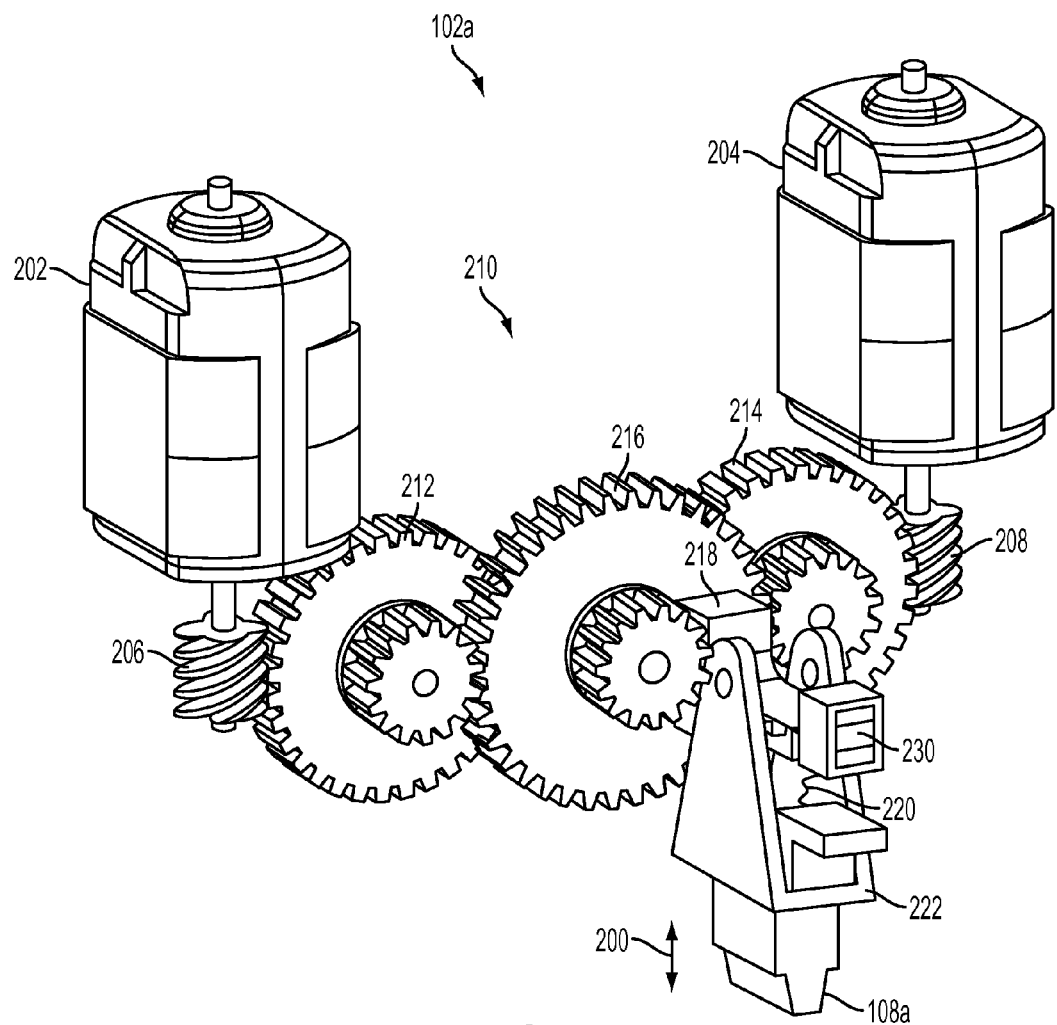
FIG. 2 diagrammatically illustrates a first embodiment of a steering shaft lock actuator.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

The description provided herein is with reference to various exemplary embodiments. It is to be understood that the embodiments described herein are presented by way of illustration, not of limitation. The present disclosure may be incorporated into a wide variety of systems without departing from the spirit and scope of the present disclosure.

Turning now to FIGS. 1A-1C, there is shown in block diagram form an exemplary steering shaft lock actuator 102 consistent with the present disclosure in an unlocked position (FIG. 1A), a cocked position (FIG. 1B), and a locked position (FIG. 1C.) The steering shaft actuator 102 may include a locking pawl 108 coupled to one or more reversible drive motors through a gear train for extending and retracting the locking pawl 108 to lock and unlock a steering shaft 110. In one exemplary embodiment, a toothed ring 140 may be affixed to the steering shaft 110 about the circumference of the steering shaft 110. For clarity of illustration, only a portion of the toothed ring 140 having teeth 142 and 144 is illustrated. In another embodiment, one or more slots may be provided in the steering shaft 110. The steering shaft 110 may be locked by extending the locking pawl 108 into engagement with toothed ring 140 on the steering shaft 110.

FIG. 1A illustrates the steering shaft lock actuator 102 in an unlocked position with the locking pawl 108 retracted away from the toothed ring 140. In the unlocked position, the steering shaft 110 is free to rotate, unencumbered by the locking pawl 108. FIG. 1B illustrates the steering lock actuator 102 in a cocked position wherein the locking pawl 108 is extended toward the toothed ring 140 but has been blocked from entering a recess 143 between adjacent teeth 142, 144 by an obstruction. In one example, the obstruction may occur when the locking pawl 108 and the teeth 142, 144 of the toothed ring 140 are not properly aligned so that the locking pawl 108 contacts one of the teeth, e.g., tooth 142, as it attempts to extend into the recess 143.

Advantageously, the steering lock actuator 102 may include a lost motion device, e.g., a compression spring in one embodiment, having sufficient stored energy in the cocked position to drive the locking member 108 once the obstruction is removed. Thus, the actuator and a motor therein may be de-energized when the locking pawl 108 is in the cocked position. For instance, as the steering shaft 110 is rotated counterclockwise from its position illustrated in FIG. 1B to its position illustrated in FIG. 1C, the lost motion device may force the locking pawl 108 to fully extend to a locked position into the recess 143 between teeth 142 and 144 of the toothed ring 140.

FIG. 2 diagrammatically illustrates one exemplary embodiment of a steering shaft lock actuator 102a consistent with the present disclosure. The steering shaft lock actuator 102a may be configured to urge the locking pawl 108a substantially linearly in the directions indicated by arrows 200 to the unlocked, cocked, and locked positions, e.g. as illustrated in FIGS. 1A-1C.

The illustrated exemplary embodiment includes first 202 and second 204 reversible drive motors 202, 204. The motors 202 and 204 may be configured for driving a common gear train 210 through associated worm drives 206, 208. The gear train 210 may include a worm gear 212, 214 associated with each motor 202, 204. However, this arrangement is not necessary and the motors 202, 204 may be arranged to drive the same worm gear. The worm gears 212, 214, in turn, may drive a common compound gear 216. Other configurations for the gear train 210 are possible. For example, a single worm gear could act as the compound gear or one could use multiple compound gears in series. The function would be the same except for the impact on system gear ratio. More gears would provide a higher overall ratio.

The last compound gear in the train 216, (if there are multiple compound gears), may drive an output rack 218. The output rack 218, spring 220, and locking pawl 108a, may be captured in a carriage 222. These parts may establish a lost motion sub-assembly whereby when the output rack 218 is driven it pushes on the spring 220 which, in turn, pushes on the locking pawl 108a. The locking pawl 108a, when extended, may enter a recess 143 on the steering shaft 110 (e.g. a space between teeth 142, 144 of a toothed ring 140, etc.) in the steering shaft as explained above with respect to FIG. 1. When the locking pawl 108a is engaged, the steering system is locked and will not rotate.

In the illustrated exemplary embodiment, the worm gear stage is not back drivable. The motors 202, 204 may drive the system in either direction, but applying force (or torque) to any stage of the gear train 210 cannot back drive the motors 202, 204. If only one motor is energized, the other motor worm cannot be back-driven and the gear train 210 will not cycle. If the motors 202, 204 are controlled independently, the steering lock actuator system 102a is inherently fail safe, because only if both motors 202, 204 are energized simultaneously in the same direction will the steering lock actuator system 102a lock the steering shaft 110.

Figure 3:
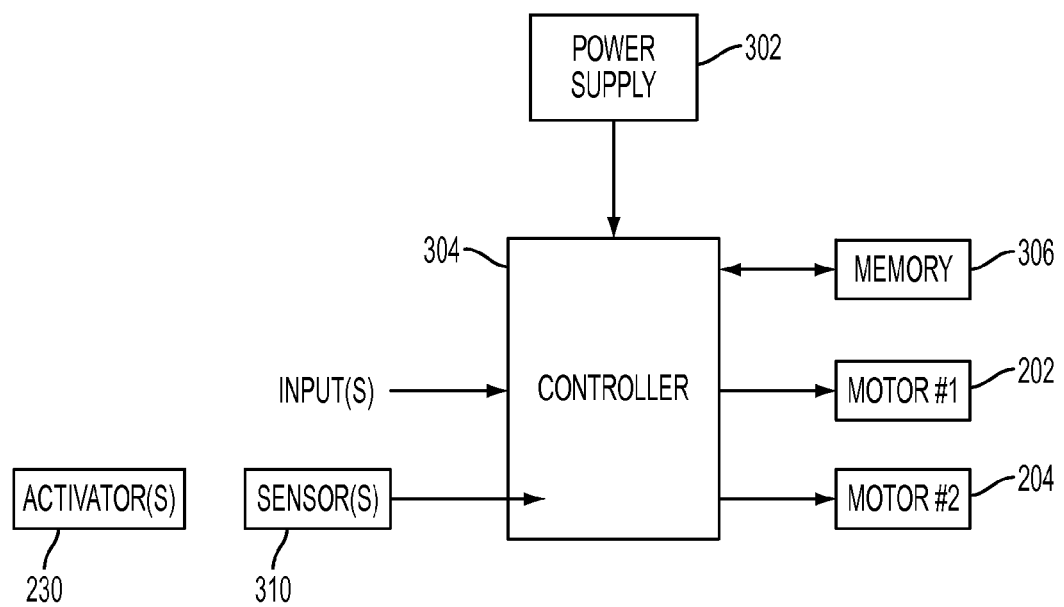
FIG. 3 is a block diagram of one embodiment of an electrical control circuit that may be utilized to control a steering shaft lock actuator consistent with the present disclosure.

FIG. 3 illustrates, in block diagram form, one embodiment of an electrical control circuit that may be utilized to control a steering shaft lock actuator consistent with the present disclosure. A controller 304 may be provided on a printed circuit board (PCB) (not shown), which may be integrated into packaging/housing of the steering lock actuator, and a may accept a variety of input signals to independently drive the motors 202, 204 to thereby control the position of the locking pawl 108a. In one embodiment, different activation signals may be provided by independent control circuits to separately drive the motors 202, 204, thereby providing a failsafe feature. For example, if one motor is activated by a discrete input signal on a dedicated line and another motor is activated by an encrypted message on a serial communication buss, the system would not function unless both input signals are present.

In one embodiment, the controller 304 may include a microcontroller. One or more sensors 310, e.g. Hall Effect sensors, on the PCB may be activated by an activator, such as a magnet 230 coupled to the output rack or locking pawl. These sensors 310 may be used to determine if the locking pawl 108a is engaged into the steering shaft, (locked), or disengaged, (unlocked). One or more of the sensors 310 could be configured as a mechanical switch or an optical switch activated by an associated mechanical or optical activator.

The controller 304 may also store and retrieve information from memory 306. A power supply 302 may provide power for the controller 304 and may also provide dedicated I/O lines from discrete vehicle inputs communicated to the actuator via a serial data bus (e.g., a LIN, CAN or J1850 bus). Other inputs may also be provided to the controller 304, e.g., a user command to drive the locking pawl 108a toward the locked position may also be received by the controller 304.

Figure 4:
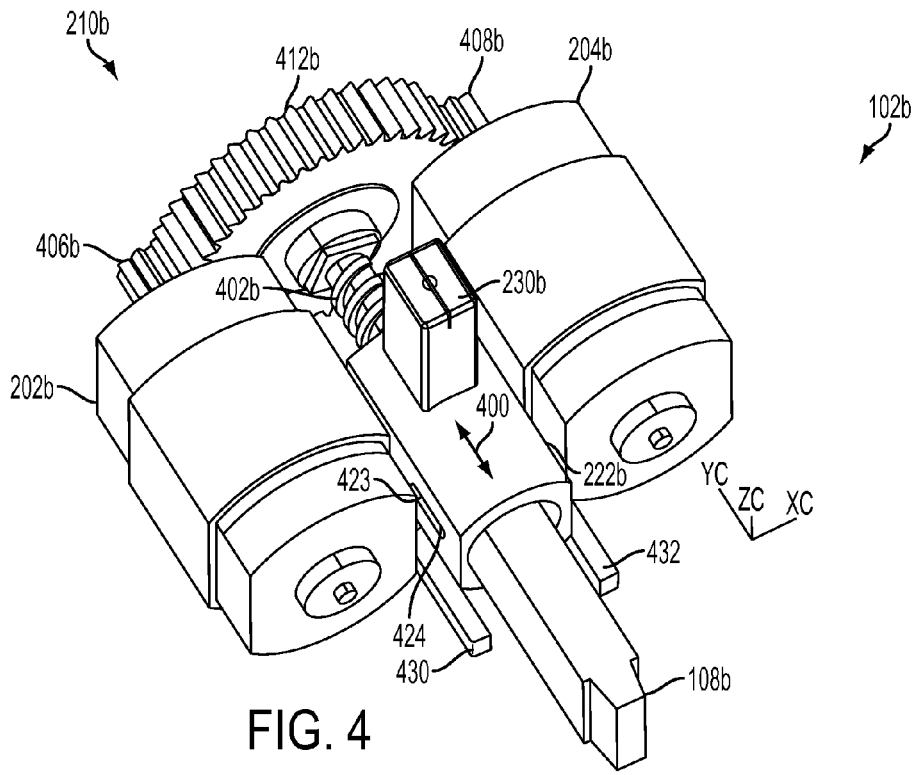
FIG. 4 is a perspective view of a gear train portion of another embodiment of a steering shaft lock actuator.

FIG. 4 diagrammatically illustrates another embodiment of a steering shaft lock actuator 102b consistent with the present disclosure. The steering shaft lock actuator 102b may be configured to move a locking pawl 108b substantially linearly in the directions of arrows 400 between unlocked, cocked, and locked positions, e.g. as generally illustrated in FIGS.

1A-1C. In the illustrated embodiment, the steering shaft lock actuator 102b may include two or more drive motors 202b, 204b. The motors 202b, 204b may drive a common gear train 210b, for example through associated motor pinions 406b, 408b. The gear train 210b may include a single spur gear 412b driven by the motor pinions 406b, 408b. The spur gear 412b may be coupled to a worm 402b such that rotation of the spur gear 412b results in corresponding rotation of the worm 402b.

A carrier 222b may be provided for capturing a spring, the locking pawl 108b, and a drive nut. The motors 202b, 204b and associated motor pinions 406b, 408b may drive the spur gear 412b which in turn may drive the worm 402b. As the worm 402b rotates, carrier 222b is driven along the threads of the worm 402b in a substantially linear motion, thus moving the carrier 222b in the direction of arrows 400 between the locked and unlocked positions. The locking pawl 108b may be provided with a roll pin 423 configured to slide within a slot 424 disposed in the carrier 222b and may be backed by a spring to provide lost-motion as generally described above.

The carrier 222b may also be provided with one or more interlocking pins (for example, a first and a second interlocking pin 430, 432) configured to move with the carrier 222b and to engage with at least a portion of a steering shaft interface as will be described in greater detail hereinbelow. The lost-motion feature of the present disclosure may allow the interlocking pins 430, 432 to engage with the steering shaft interface regardless of the status of the locking pawl 108b. For example, the lost-motion feature will allow the interlocking pins 430, 432 to engage with the steering shaft interface even if the locking pawl 108b is in the blocked/cocked position as generally illustrated in FIG. 1B since the spring will allow sufficient energy to be stored energy while the locking pawl 108b is stationary in the cocked or blocked position and will drive the locking pawl 108b once the obstruction is removed. Additionally, the carrier 222b may be provided with one or more magnets 230b. The magnets 230b may be used to active one or more sensors as described above to determine if the locking pawl 108b is engaged into the steering shaft (locked) or disengaged (unlocked). One or more of the sensors could be configured as a mechanical switch or an optical switch activated by an associated mechanical or optical activator.

Figure 5:
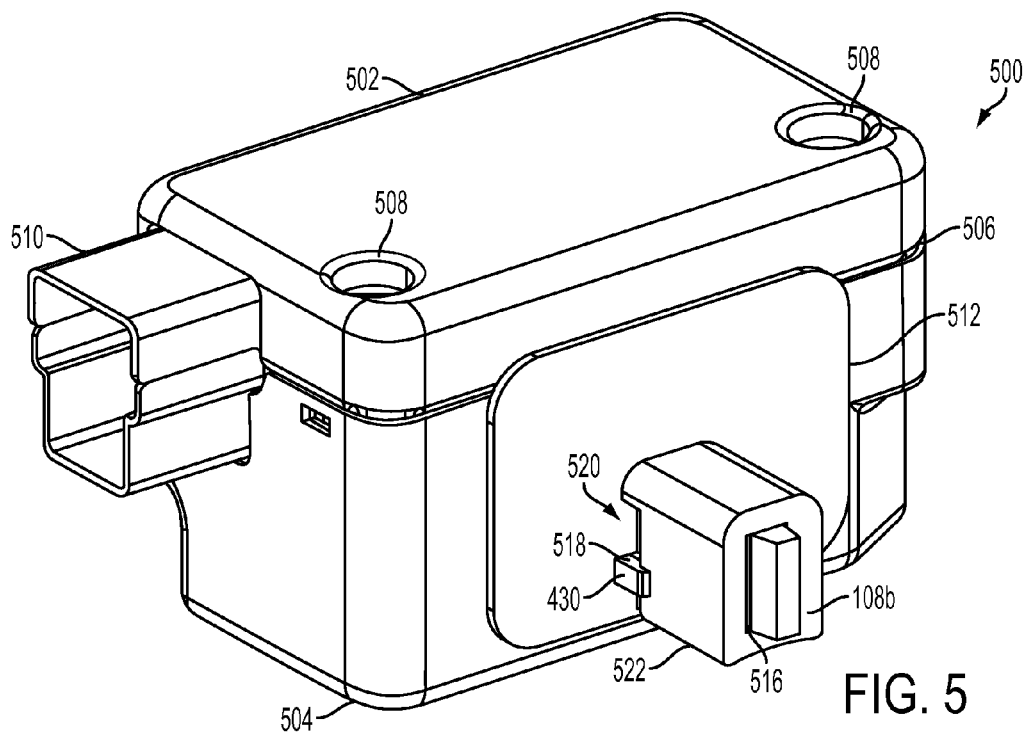
FIG. 5 is a perspective view of the actuator portion of FIG. 4 incorporated into a housing.

FIG. 5 illustrates one embodiment of an actuator housing 500 for receiving the steering shaft lock actuator 102b. The actuator housing 500 may include a top portion 502 configured to be secured to a bottom portion 504. The housing 500 may also include a seal 506 configured to be disposed between the top and bottom portions 502, 504 and to reduce and/or prevent debris from entering the housing 500 and contaminating the steering shaft lock actuator 102b. The top and bottom portions 502, 504 may be coupled, mounted, or otherwise secured to each other in any manner known to those skilled in the art including, but not limited to, welding, adhesives, one or more fasteners (for example fasteners configured to be received in openings 508), or the like. The housing 500 may be provided with one or more electrical connector interfaces 510 for receiving and/or transmitting information between the vehicle and the steering shaft lock actuator 102b.

The locking pawl 108b may be received within the actuator housing 500 such that at least a portion of the locking pawl 108b may extend beyond the actuator housing 500 when in the extended or locked position. The actuator housing 500 may also include a locking pawl guide portion 512 that may be configured to at least partially receive a portion of the locking pawl 108b and the interlocking pins 430, 432. The locking pawl guide portion 512 may be provided as an integral feature of the actuator housing 500 or may be provided as a separate element which may be secured to the actuator housing 500.

In one embodiment, the locking pawl guide portion 512 may be provided with an opening 516 sized and shaped to at least partially receive a portion of the locking pawl 108b such that at least a portion of the locking pawl 108b may extend beyond the locking pawl guide portion 512 when in the extended or locked position. The locking pawl guide portion 512 may also be provided with one or more openings 518 configured to at least partially receive a portion of the interlocking pins 430, 432 such that at least a portion of the interlocking pins 430, 432 may extend beyond the locking pawl guide portion 512 as the carrier 222b is moved to prevent the steering shaft lock actuator 102b from being removed. The opening 518 may be provided within one or more undercuts 520 configured such that the interlocking pins 430, 432 are at least partially recessed from an outer portion 522 of the locking pawl guide portion 512.

Figure 6:
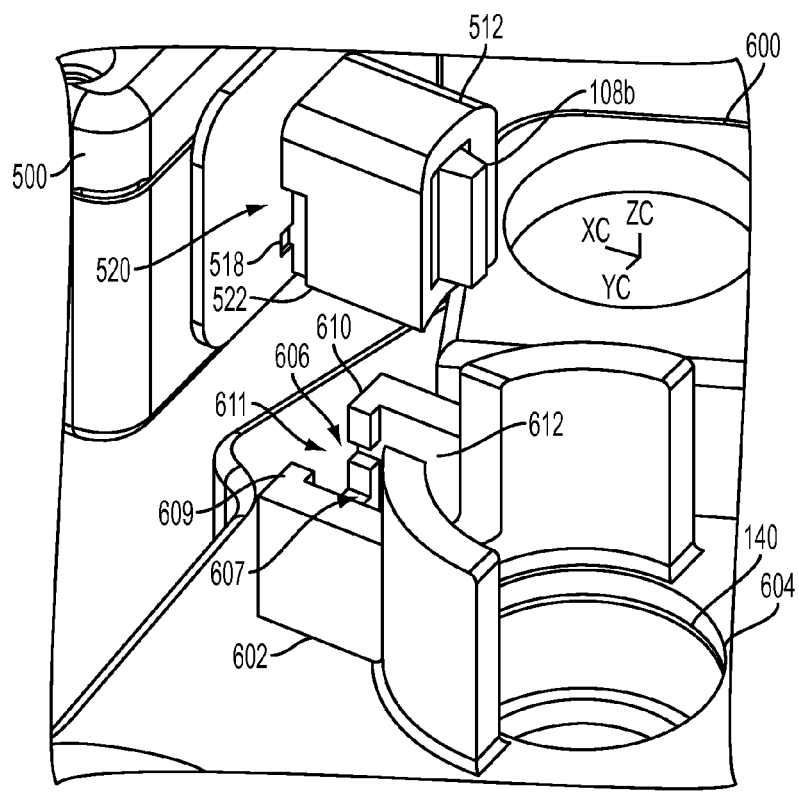
FIG. 6 is a perspective view of one embodiment of an actuator and a steering shaft interface in an unassembled position.

Referring to FIG. 6, a steering shaft interface 600 may be provided with a housing receptacle 602 for receiving at least a portion of the locking pawl guide portion 512. According to one embodiment, the steering shaft interface 600 may be provided as a cast or molded element and may include an opening 604 through which the steering shaft 110 may pass through. A splined or toothed ring 140 may be configured to be positioned substantially adjacent to the locking pawl 108b to lock the steering shaft when the locking pawl 108b is in the locked position (as generally illustrated in FIG. 1C). The housing receptacle 602 may include a cavity 607 sized and shaped to at least partially surround a plurality of sides of the locking pawl guide portion 512. The housing receptacle 602 may also include at least one tab (for example a first and a second tab 609, 610) extending generally along at least a portion of a first opening 611 in the cavity 607. The first opening 611 may be configured to matingly receive a portion of the locking pawl guide portion 512. The tabs 609, 610 may be provided with one or more interlocking features 606 configured to receive and engage at least a portion of the interlocking pins 430, 432 and to trap the locking pawl guide portion 512 (and hence the steering shaft lock actuator 102b) with respect to the steering shaft interface 600.

Figure 7:
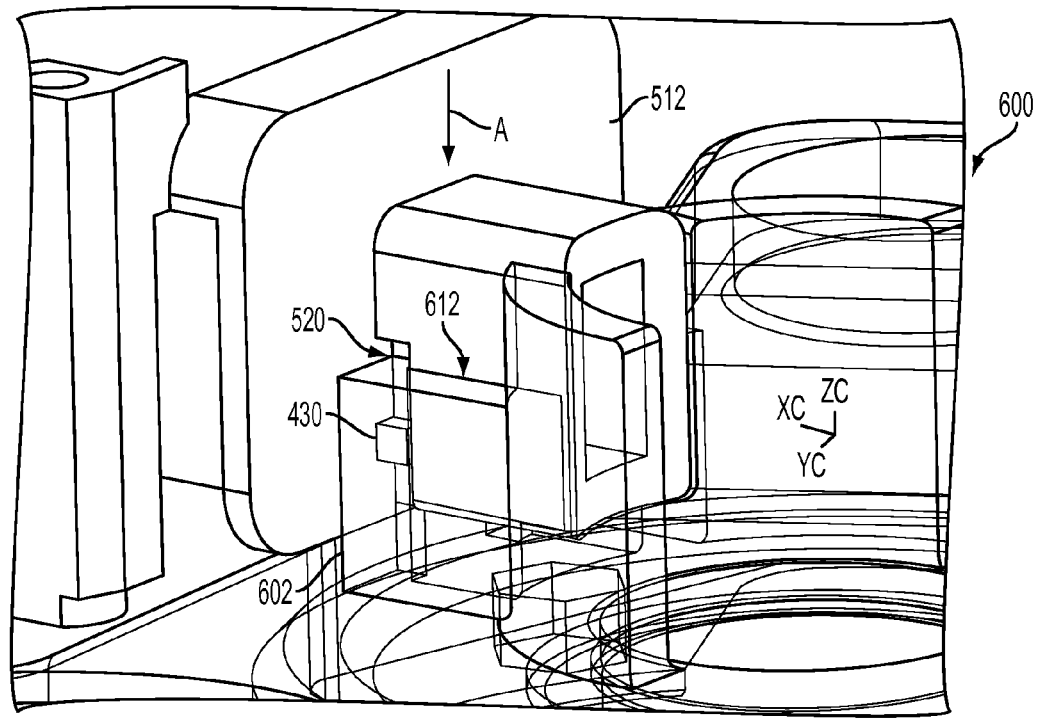
FIG. 7 is a perspective view of the actuator housing and steering shaft interface shown in FIG. 6 in an assembled position.

FIG. 7 shows the locking pawl guide portion 512 matingly received and trapped within the housing receptacle 602 of the steering shaft interface 600. As can be seen, the locking pawl guide portion 512 may be moved generally in the direction of arrow A through a second opening 612 in the housing receptacle 602 and into the cavity 607. The tabs 609, 610 on the housing receptacle 602 may be matingly received in the undercuts 520 of the locking pawl guide portion 512 until the locking pawl guide portion 512 is seated within the housing receptacle 602. Once seated within the housing receptacle 602, the interlocking pins 430, 432 may be extended outwardly through the openings 518 in the locking pawl guide portion 512 by moving the carrier 222b toward the locked position until the interlocking pins 430, 432 engage with the interlocking features 606 of the housing receptacle 602. Once the interlocking pins 430, 432 are engaged with the interlocking features 606 of the housing receptacle 602, the locking pawl guide portion 512 (and hence the steering shaft lock actuator 102b) is prevented from moving with respect to the steering shaft interface 600. As a result, the steering shaft lock actuator 102b cannot be removed from the steering shaft.

Figure 8:
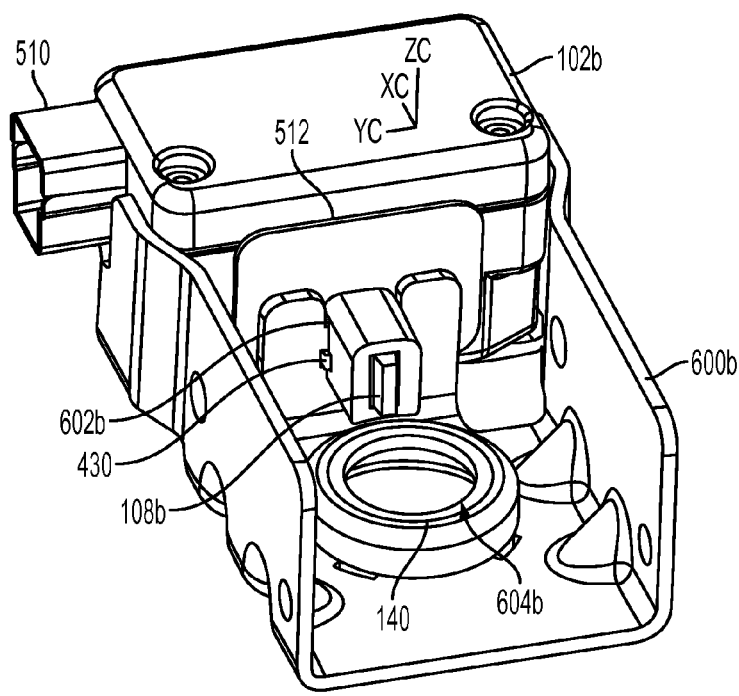
FIG. 8 is a perspective view of another embodiment of an actuator housing and steering shaft interface in an assembled position.
Figure 9:
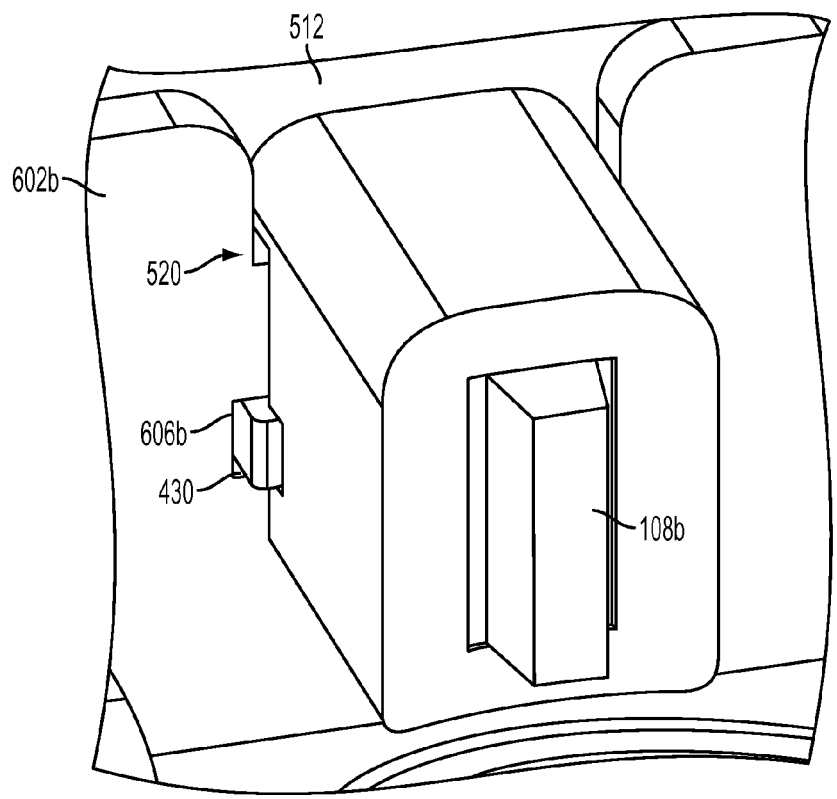
FIG. 9 is a close-up view of the interface between the actuator housing and steering shaft interface shown in FIG. 8.

FIG. 8 shows one embodiment of a steering shaft interface 600b stamped as a bracket. The steering shaft interface bracket 600b may be provided having an opening 604b through which the steering shaft 110 may pass through and a splined or toothed ring 140 positioned substantially adjacent to the locking pawl 108b to lock the steering shaft when the locking pawl 108b is in the locked position. The steering shaft interface bracket 600b may also be provided with a housing receptacle 602b configured to receive the undercuts 520 of the locking pawl guide portion 512. The housing receptacle 602b may also include interlocking features 606b configured to receive the interlocking pins 430, 432 as best shown in FIG. 9 such that the locking pawl guide portion 512 (and hence the steering shaft lock actuator 102b) are trapped with respect to the steering shaft bracket interface 600b and the steering shaft lock actuator 102b cannot be removed from the steering shaft.

Figure 10:
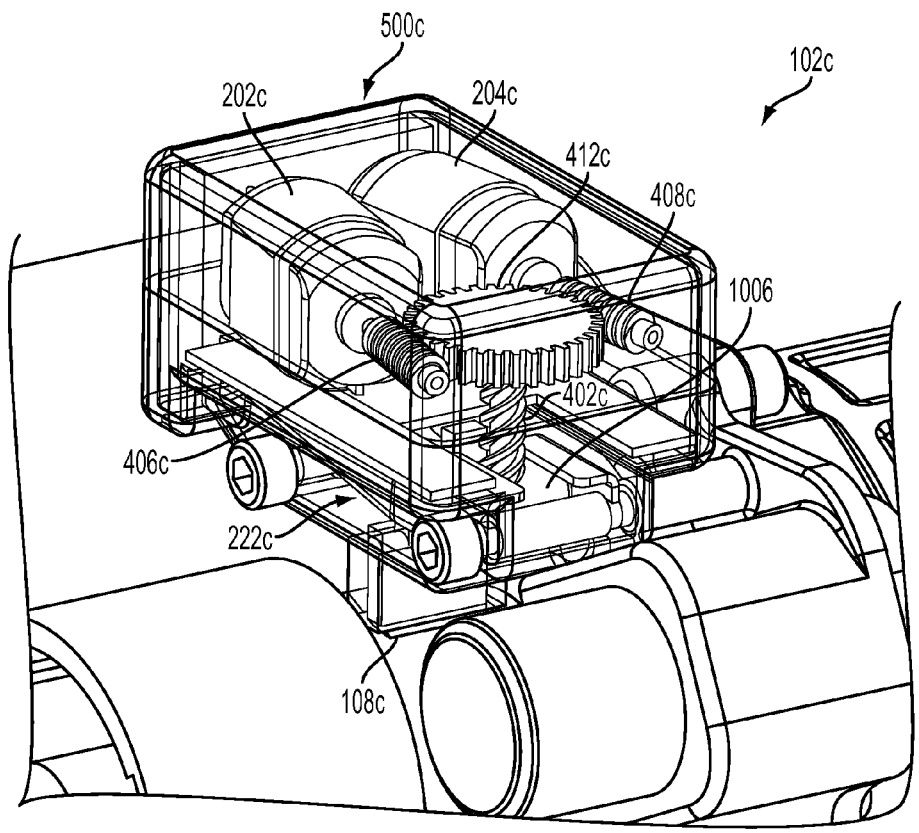
FIG. 10 is a perspective view of another embodiment of a steering shaft lock actuator.
Figure 11:
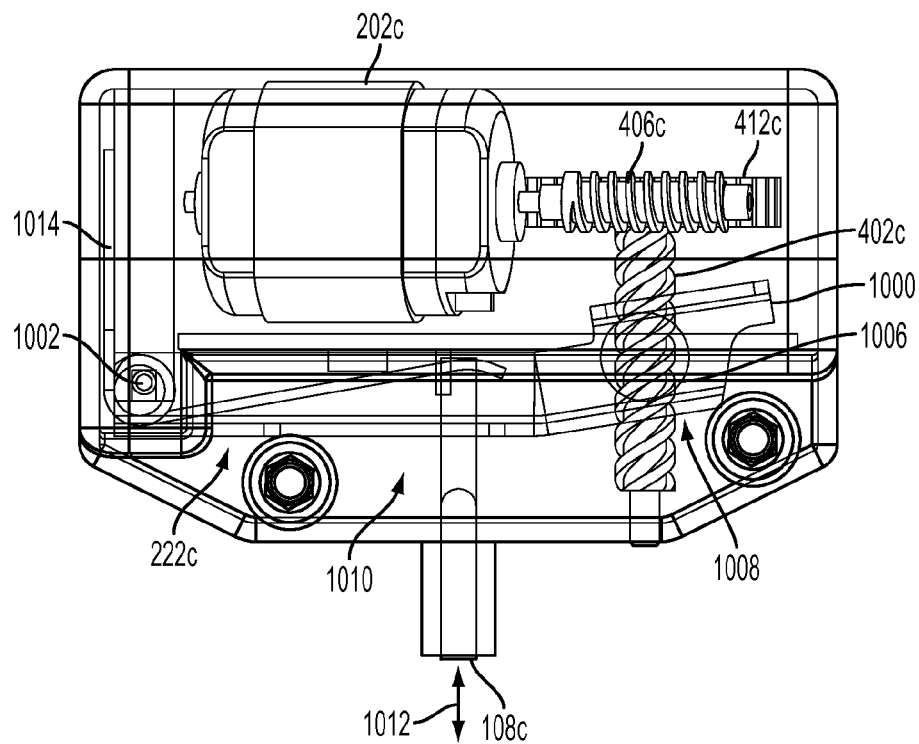
FIG. 11 is a side perspective view of the steering shaft lock actuator shown in FIG. 10 in a retracted position.

FIG. 10 shows another embodiment of a steering shaft lock actuator 102c consistent with the present disclosure. The steering shaft lock actuator 102c may be disposed within a housing 500c and may be configured to move a locking pawl 108c between unlocked, cocked, and locked positions, e.g. as generally illustrated in FIGS. 1A-1C. The steering shaft lock actuator 102c may include a carrier 222c, FIG. 11, which may be provided as a lever 1000 coupled to the housing 500c about a pivot point 1002 (FIG. 11) for capturing the spring 1004, the locking pawl 108c, and a drive nut 1006. The drive nut 1006 may be coupled to a proximate first end of a first portion 1008 of the lever 1000. The first portion 1008 of the lever 1000 may be disposed at an angle relative to a second portion 1010 which may be coupled to the housing 500c about the pivot point 1002.

Figure 12:
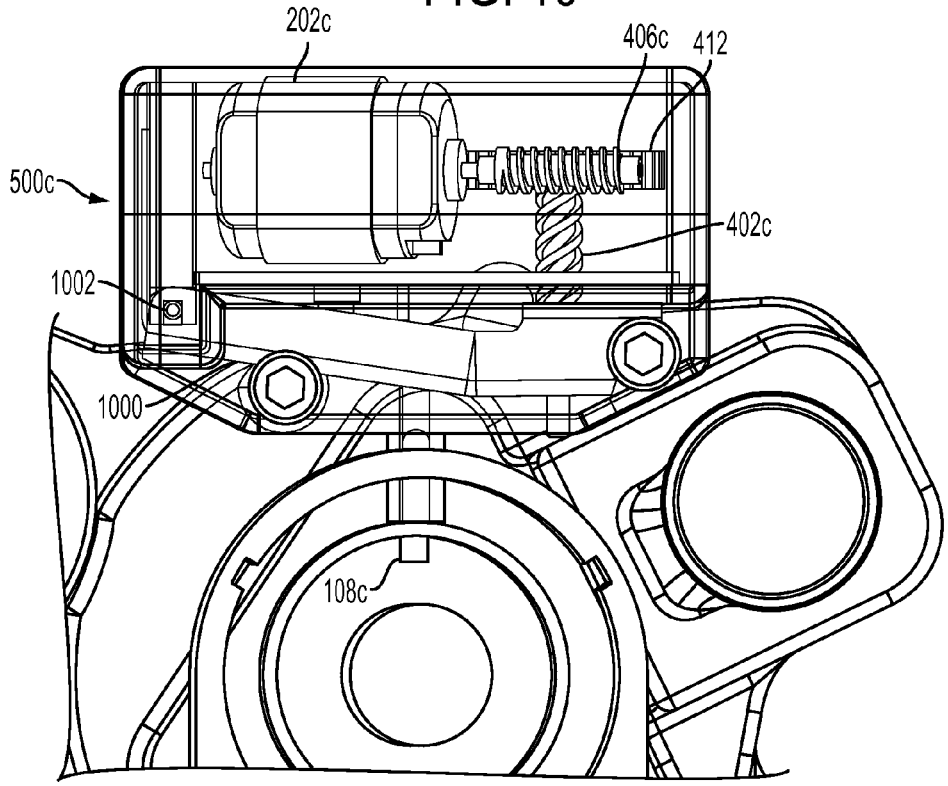
FIG. 12 is a side perspective view of the steering shaft lock actuator shown in FIG. 10 in a locked position.
Figure 13:
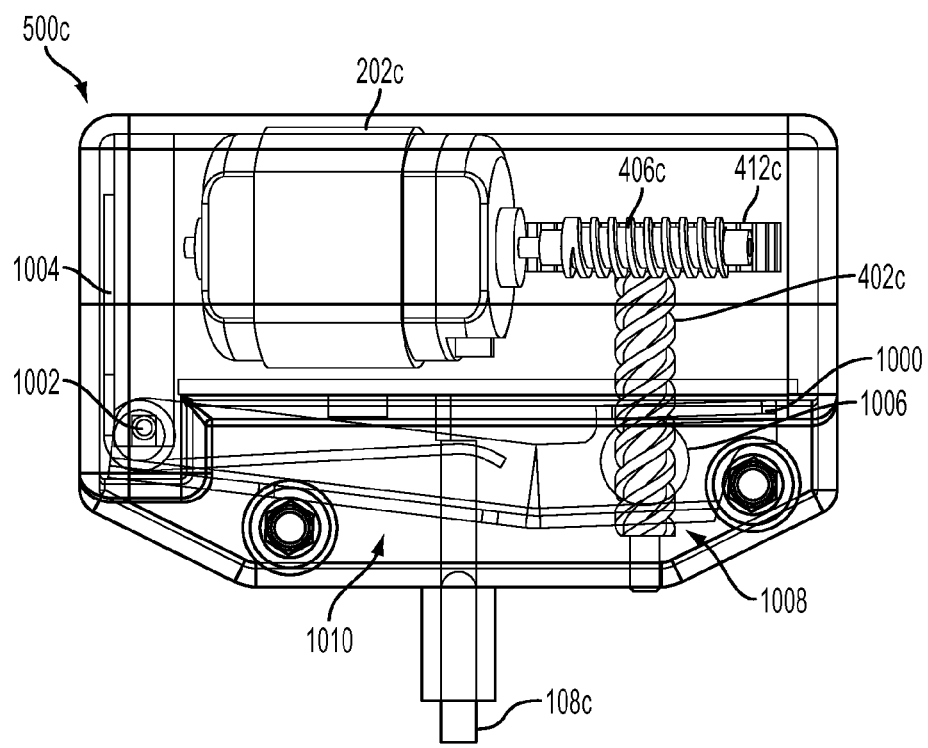
FIG. 13 is a side perspective view of the steering shaft lock actuator shown in FIG. 10 in a blocked position.

One or more motors 202c, 204c and associated motor pinions 406c, 408c may drive a spur gear 412c which in turn may drive a worm 402c. As the worm 402c rotates, the drive nut 1006 within the lever 1000 is designed to run along the threads of the worm 402c causing the lever 1000 to pivot about the pivot point 1002 and the locking pawl 108c to move generally along the direction of arrows 1012. The locking pawl 108c may move between the retracted, unlocked position shown in FIG. 11 and the extended, locked position shown in FIG. 12. Additionally, the locking pawl 108c may be coupled to the lever 1000 by a spring 1004 as generally described above such that the locking pawl 108c and the steering shaft lock actuator 102c form a lost-motion device having sufficient stored energy in the cocked or blocked position (as generally shown in FIG. 13) to drive the locking pawl 108c toward the locked position once the obstruction is removed. Thus, the steering shaft lock actuator 102c and motors 202c, 204c therein may be de-energized when the locking pawl 108c is in the locked position and the spring may force the locking pawl 108c to fully extend to a locked position.

Figure 14:
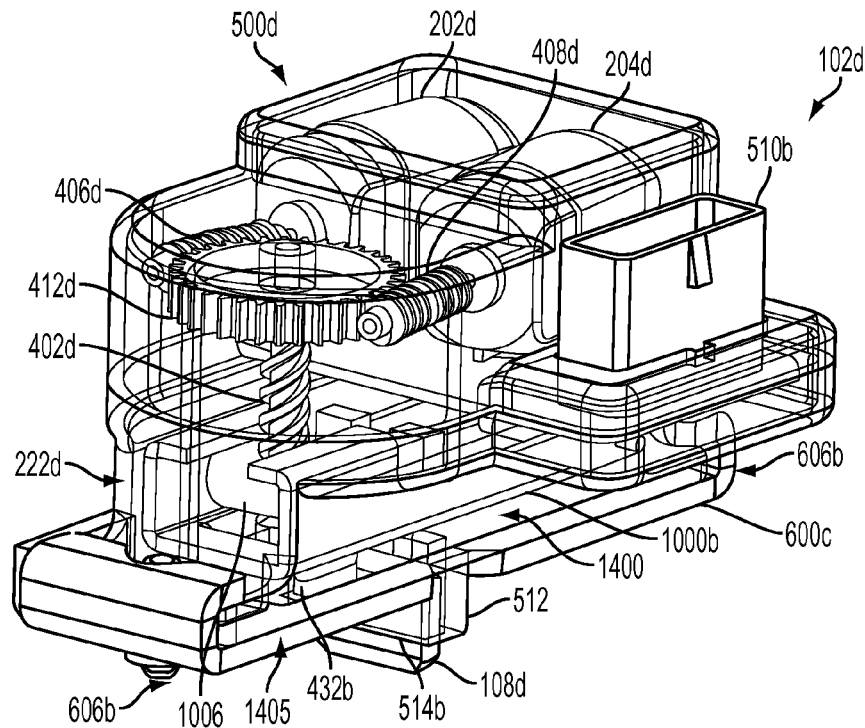
FIG. 14 is a perspective view of yet another embodiment of a steering shaft lock actuator.

FIG. 14 shows yet another embodiment of a steering shaft lock actuator 102d consistent with the present disclosure. The steering shaft lock actuator 102d may be disposed within a housing 500d and may be configured to move a locking pawl 108d within a locking pawl guide portion 512b between unlocked, cocked, and locked positions. The locking pawl guide portion 512b may be provided with an opening 514b sized and shaped to at least partially receive a portion of the locking pawl 108d such that at least a portion of the locking pawl 108d may extend beyond the locking pawl guide portion 512b when in the extended or locked position. According to one embodiment, the locking pawl guide portion 512b may be provided as an integral feature of the actuator housing 500d or may be provided as a separate element. The housing 500d may also include one or more electrical connector interfaces 510b.

Figure 15:
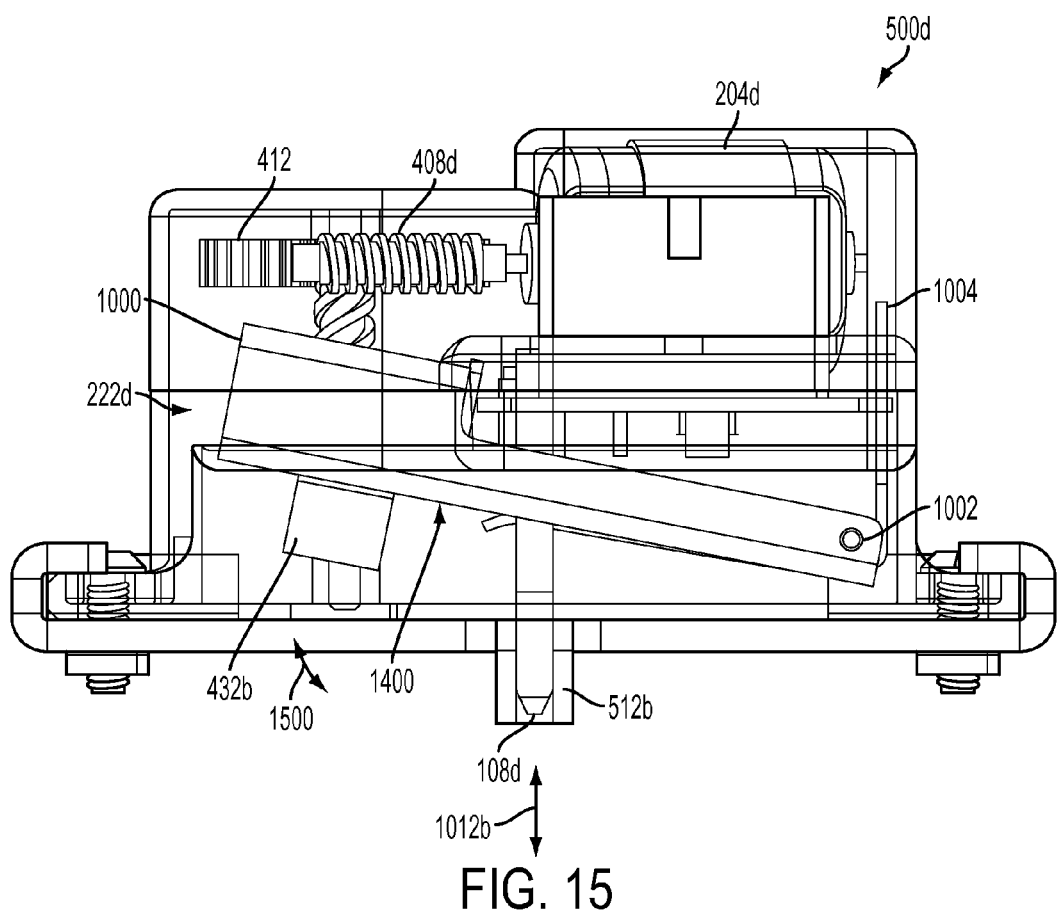
FIG. 15 is a side perspective view of the steering shaft lock actuator shown in FIG. 14 in a retracted position.

A carrier 222d, FIGS. 14 and 15, may be provided as a lever 1000b coupled to the housing 500d about a pivot point 1002. The lever 1000b may be provided having a generally planar bottom surface 1400 and may capture a spring 1004, a drive nut 1006, a locking pawl 108d, and one or more interlocking pins (for example, a first and a second interlocking pin 430b, 432b extending generally outwardly from the lever 1000b). One or more motors 202d, 204d and associated motor pinions 406d, 408d may drive a spur gear 412d which in turn may drive a worm 402d causing the drive nut 1006 coupled to the lever 1000b to run along the threads of a worm 402d. As the drive nut 1006 moves along the worm 402d, the lever 1000b may pivot about the pivot point 1002 and the locking pawl 108d and interlocking pins 430b, 432b may move generally along the direction of arrows 1012b and arc 1500, respectively. The locking pawl 108d and interlocking pins 430b, 432b may move between the retracted, unlocked position shown in FIG. 15 and the extended, locked position shown in FIG. 14. The locking pawl 108d may also be coupled to the lever 1000b by a spring 1004 as generally described above such that the locking pawl 108d and the steering shaft lock actuator 102d form a lost-motion device as described above in the event that the locking pawl 108d is in the cocked or blocked position.

Figure 16:
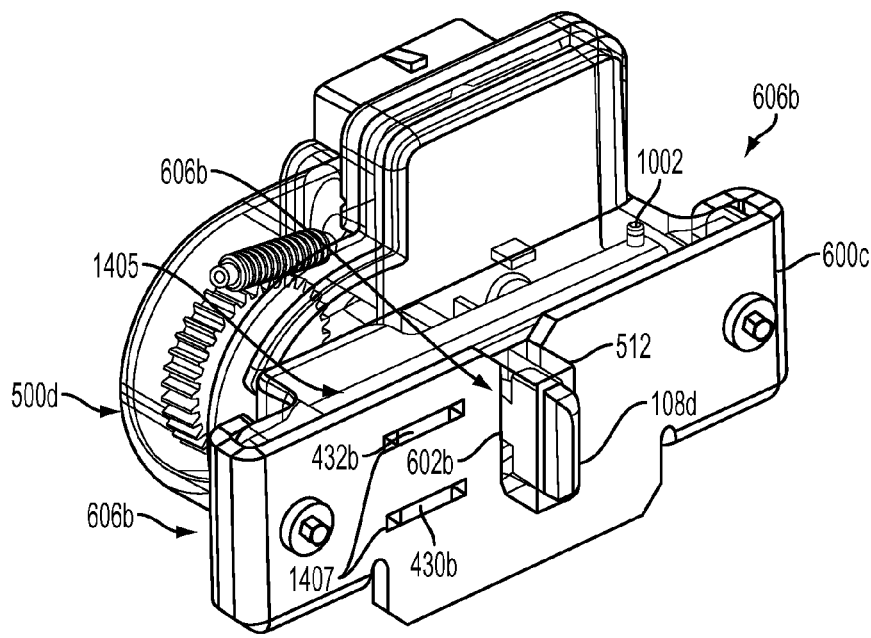
FIG. 16 is a bottom perspective view of the steering shaft lock actuator shown in FIG. 14 in a locked position.

A steering shaft interface 600c, FIG. 16, may be provided including a housing receptacle 602b for receiving at least a portion of the locking pawl guide portion 512b and may extend generally along the bottom surface 1405 of the housing 500d. The steering shaft interface 600c may be coupled to the steering shaft in any manner known to those skilled in the art (for example, but not limited to, a fastener or the like) and may include one or more interlocking features 606b configured to extend around at least a portion of the housing 500d and may generally retain the housing 500d to the steering shaft interface 600c. In the exemplary embodiment, the interlocking features 606b may include a "C" shaped channel or groove configured to matingly accept a portion of the housing 500d. The steering shaft interface 600c may also include one or more slot or openings 1407 configured to receive the interlocking pins 430b, 432b coupled to the lever 1000b. As the lever 1000b moves from the retracted position to the locked position, the interlocking pin 430b, 432b may pass at least partially into the openings 1407 in the steering shaft interface 600c. The combination of the interlocking features 606b and the interlocking pin 430b, 432b received within the openings 1407 traps the housing 500d to the steering shaft interface 600c and prevents the locking pawl 108d from being removed from the steering shaft.

Figure 17:
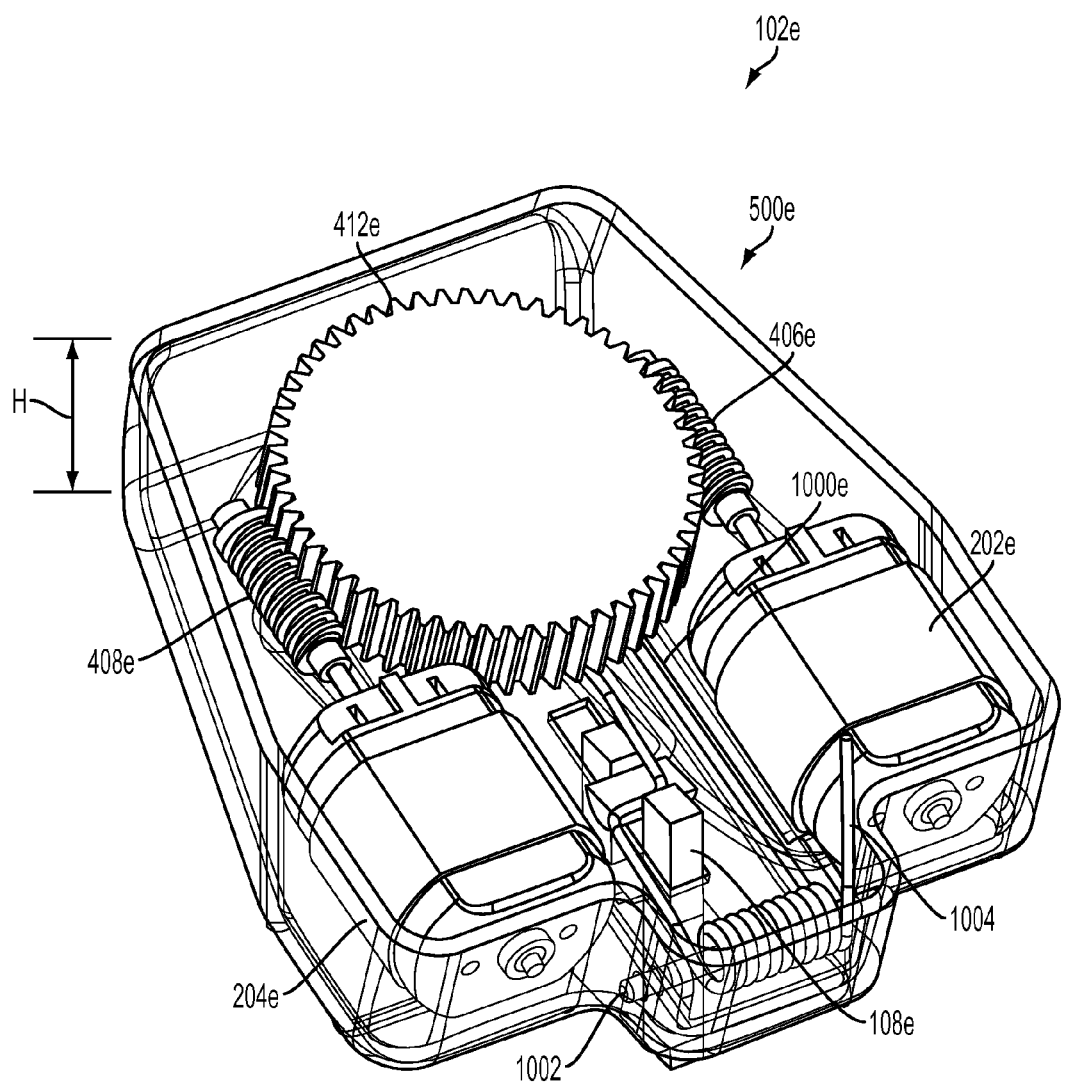
FIG. 17 is a top perspective view of a low profile steering shaft lock actuator and actuator housing.

FIG. 17 shows yet further embodiment of a steering shaft lock actuator 102e consistent with the present disclosure. The steering shaft lock actuator 102e is generally consistent with the steering shaft lock actuators 102 shown in FIGS. 10-16, however, the housing 500e may be provided having a low profile. The overall height H of the housing 500e may be reduced compared to the housings described above. As a result, the steering shaft lock actuator 102e may be useful in a wider range of applications where package size is a limiting factor.

Figure 18:
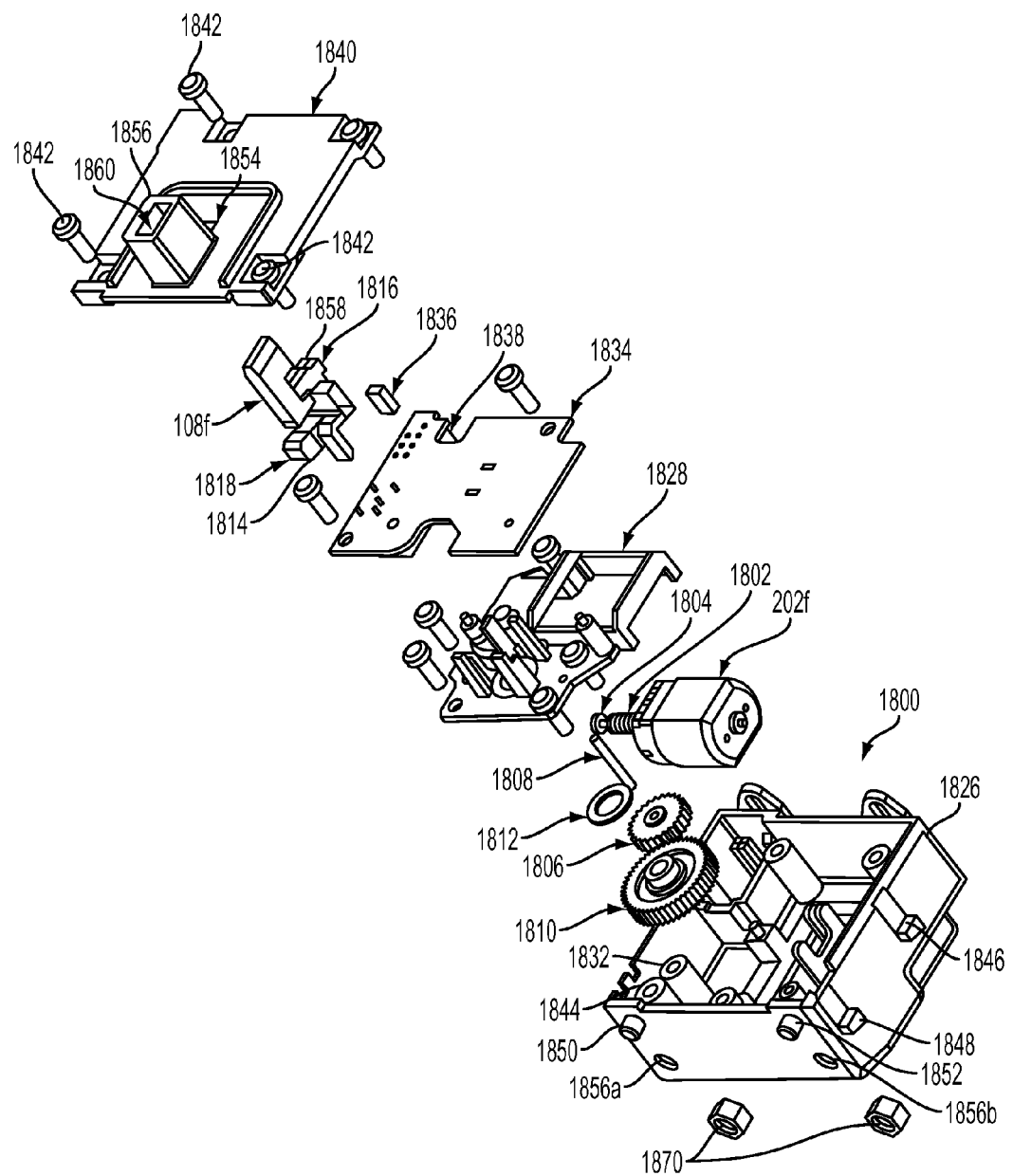
FIG. 18 is an exploded view of yet another embodiment of a steering shaft lock actuator.

FIG. 18 is an exploded view of another embodiment of a steering shaft lock actuator consistent with the present disclosure. The steering shaft lock actuator may be disposed within a housing 1800 and may be configured to move a locking pawl 108f between unlocked, cocked, and locked positions, e.g. as generally illustrated in FIGS. 1A-1C. The illustrated exemplary embodiment includes a single reversible motor 202f having a worm gear 1802 and thrust plate 1804 coupled to an output thereof. The worm gear 1802 is in meshing engagement with a compound gear 1806 fixed for rotation about an axle 1808. The compound gear drives an output gear 1810. The output gear may have a thrust washer 1812 coupled thereto and drives a second worm gear 1814 coupled to a carrier 1816.

Figure 19:
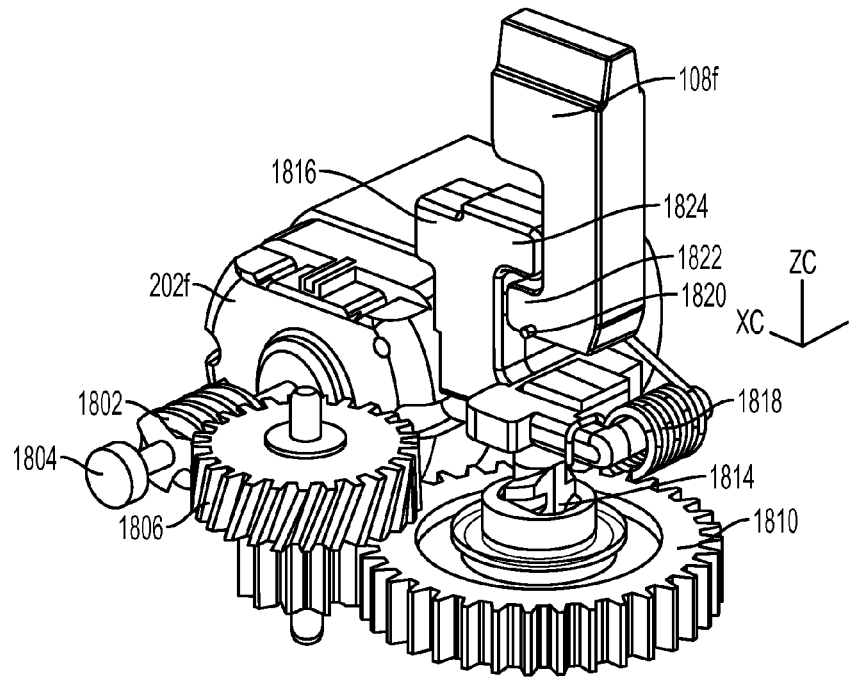
FIG. 19 is a perspective view of a gear train portion of the steering shaft lock actuator shown in FIG. 18.

The carrier may have a locking pawl 108*f* coupled thereto through a spring 1818. In the illustrated exemplary embodiment, the carrier and locking pawl are generally U-shaped and are positioned in an interlocking manner as shown in FIG. 19 to establish a lost-motion feature for accommodating a blocked locking pawl condition. The spring 1818 may be a torsion spring having one end fixed to the carrier 1816 and another end 1820 disposed against an inner leg 1822 of the locking pawl to bias the locking pawl toward an outer leg 1824 of the carrier.

The motor, axle, thrust washer, compound gear and output gear may be received in a bottom portion 1826 of the housing 1800 and retained therein by a retainer 1828 secured to the bottom portion of the housing. The retainer 1828 may be secured to the bottom housing portion in any manner known to those skilled in the art including, but not limited to fasteners configured to be received in openings 1832, or the like. A printed circuit board 1834 may be coupled to the retainer 1828 and may include a Hall Effect sensor and associated electronics for sensing a magnet 1836 disposed in an associated opening in the carrier. One or more electrical connector interfaces 1838 may be coupled to the circuit board for receiving and/or transmitting information between the vehicle and the steering shaft lock actuator. A cover portion 1840 of the housing may be fastened to the bottom portion 1826 of the housing in any manner known to those skilled in the art including, but not limited to fasteners 1842 configured to be received in openings 1844, or the like to least partially enclose the actuator components.

The bottom portion of the housing may include one or more locking tabs 1846, 1848 on the side surfaces thereof, and one or more locking posts 1850, 1852 on a bottom thereof. The locking tabs and locking posts may be positioned for mating engagement with associated features on a steering shaft interface to assist in securing the actuator to the interface. One or more fastener openings 1856*a*, 1856*b* may extend through the bottom of the bottom portion of the housing.

The cover portion may include a locking pawl guide portion 1854, and a locking pin opening 1856. When the motor is energized in a first direction of rotation a locking pin portion 1858 of the carrier may extend at least partially through the locking pin opening 1856 and the locking pawl 108*f* may extend outwardly through a locking pawl opening 1860 in the locking pawl guide portion 1854. When the motor is energized in a second direction opposite from the first direction, the locking pin portion of the carrier and the locking pawl may retract into the housing 1800. The Hall Effect sensor on the printed circuit board may be configured to provide a first input when the carrier is in a full extended position and a second output different from the first output when the carrier is in a fully retracted position. The output of the Hall Effect sensor thus provides an indication as to the position of the carrier and the locking pawl.

Figure 20:
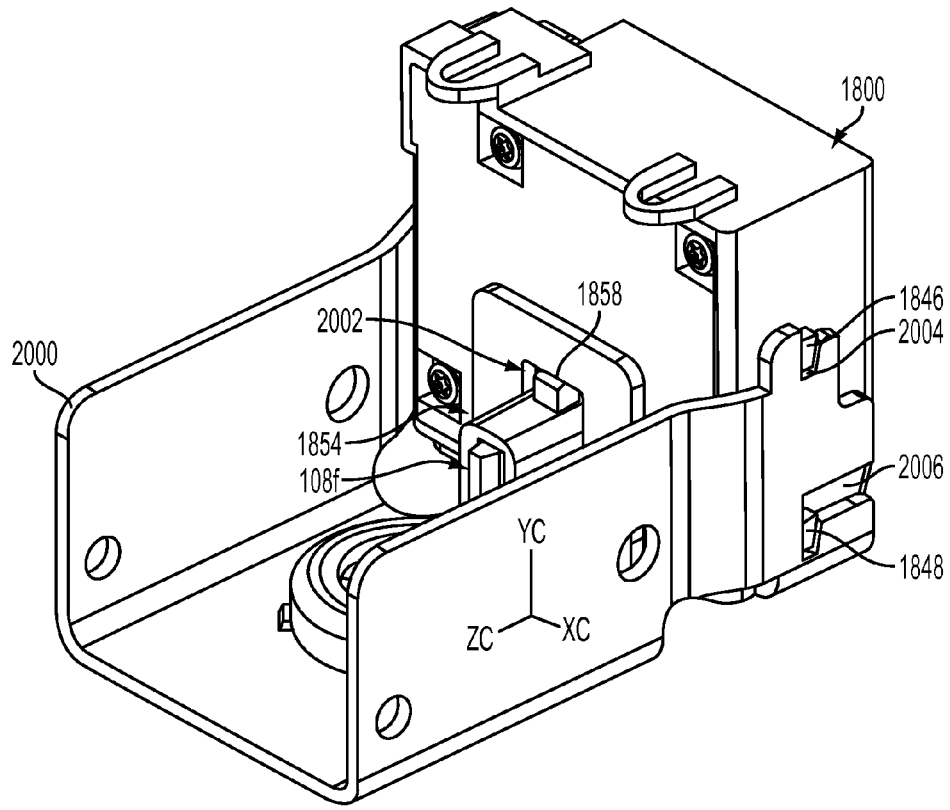
FIG. 20 is a perspective view of steering shaft lock actuator shown in FIG. 18 in a locked or extended position and assembled to a steering shaft interface.
Figure 21:
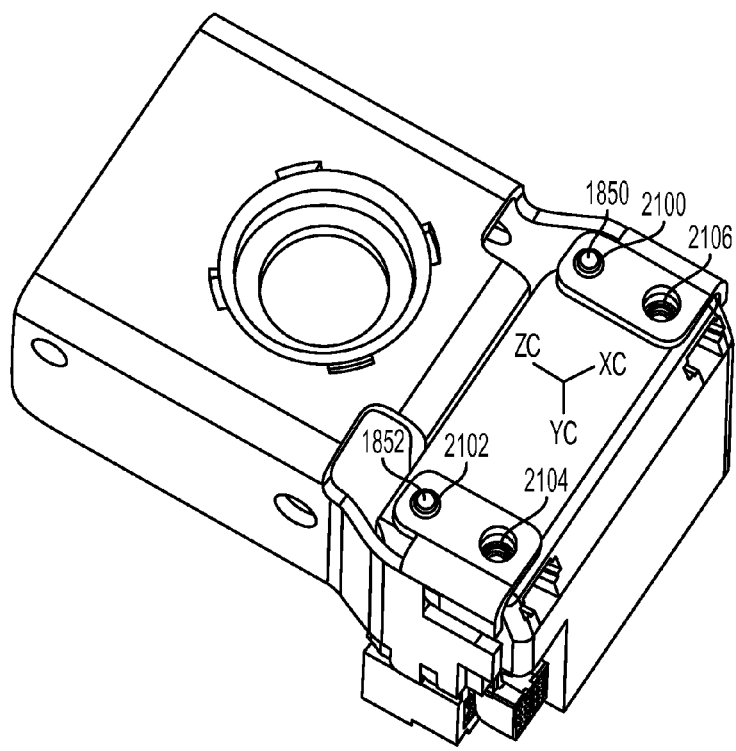
FIG. 21 is a bottom perspective view of steering shaft lock actuator shown in FIG. 18 assembled to a steering shaft interface.

FIGS. 20 and 21 illustrates the steering shaft lock actuator 102*f* coupled to an associated steering shaft interface 2000. In the illustrated exemplary embodiment, the interface is configured as a bracket including a receptacle opening 2002 for receiving the locking pawl guide portion 1854 of the housing 1800. The interface 2000 also includes locking tab slots 2004, 2006 positioned for receiving the locking tabs 1846, 1848 on either side of the housing, and locking post openings 2100, 2102 positioned for receiving the locking posts 1850, 1852 on the bottom of the housing. The illustrated embodiment also includes fastener openings 2104, 2106 positioned for alignment with the fastener openings 1856 in the bottom of the housing.

The actuator may be assembled to the interface 2000 by aligning the locking tabs 1846, 1848 with the associated locking tab slots 2004, 2006 in the interface and inserting the locking pawl guide portion 1854 of the housing through the receptacle opening 2002. The housing may then be forced downward to force the locking tabs into down-turned portions of the locking tab slots and to force the locking posts into the locking pin openings in the bracket. As shown in FIG. 21, fasteners may be positioned through openings in the bracket, through the fastener openings the housing and into fastener recesses 2104 in a back of the bottom portion of the housing. The actuator may be fastened to the interface by, for example, threading nuts 1870 onto the fasteners.

Figure 22:
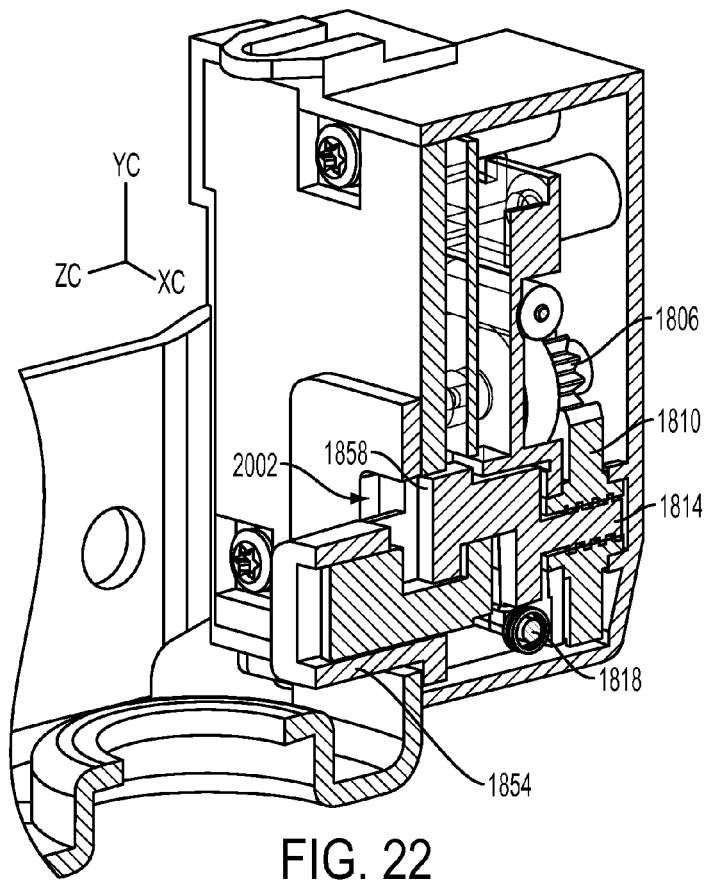
FIG. 22 is a perspective sectional view of steering shaft lock actuator shown in FIG. 18 in an unlocked or retracted position and assembled to a steering shaft interface.

When the motor is energized to fully extend the carrier, e.g. as shown in FIG. 20, the locking pin portion 1858 of the carrier extends outwardly from the housing and at least partially into the receptacle opening 2002 in the bracket. With the locking pin portion extended into the receptacle opening, the movement of the actuator relative to the interface 2000 that would be required to withdraw the locking tabs from the locking tab slots and the locking posts from the locking post openings is prevented. Even if the fasteners securing the actuator to the housing are removed, when the locking pin portion 1858 is extend into the receptacle opening, the actuator cannot be removed from the bracket without destruction of the actuator and/or the bracket. This provides an anti-theft feature by preventing facile disabling or removal of the actuator. When the carrier is in the retracted position, e.g. as shown in FIG. 22, the locking pin portion 1858 is withdrawn from the receptacle opening. Vertical movement of the actuator relative to the interface is then permitted and, once the fasteners are removed, the housing may be removed from the bracket.

Figure 23:
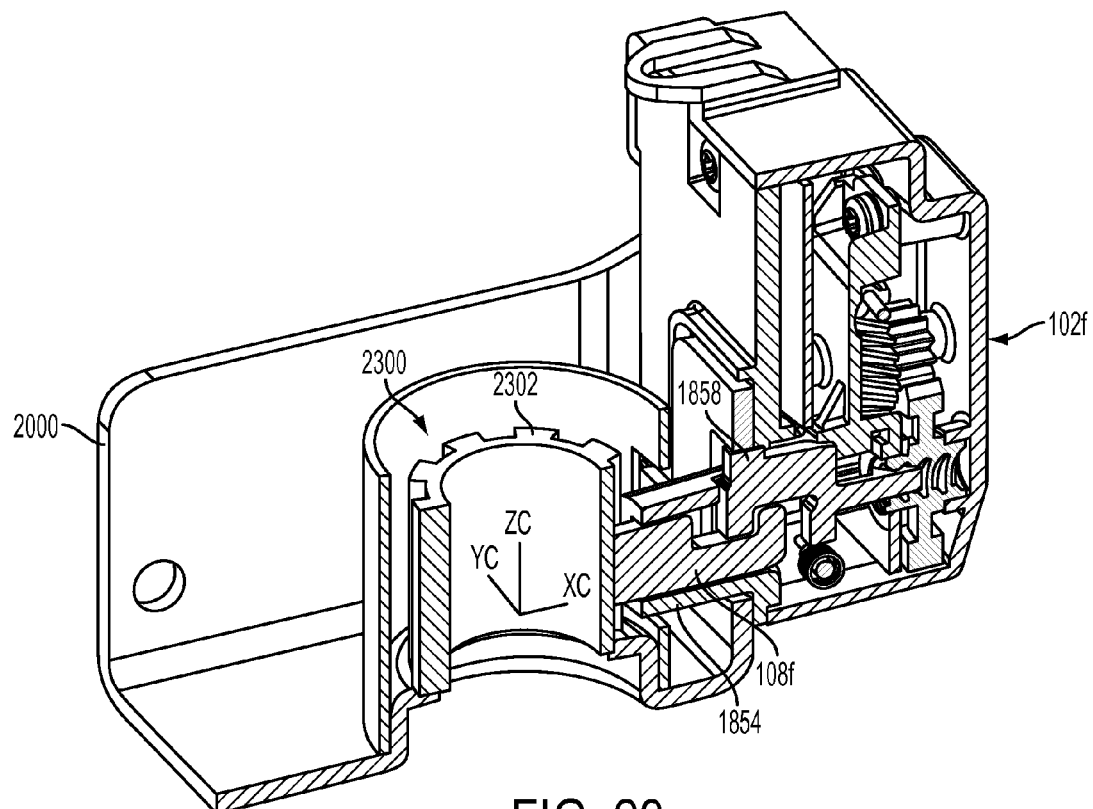
FIG. 23 is a perspective sectional view of steering shaft lock actuator shown in FIG. 18 in a locked or extended position and assembled to a steering shaft interface.

As shown in FIG. 23, the interface may include a steering shaft receptacle opening 2300 through which a steering shaft 110 may pass. A splined ring 2302 on the steering shaft, may be positioned adjacent the locking pawl guide portion 1854. When the carrier is fully extended, the locking pawl 108*f* portion may extend outwardly from the locking pawl guide portion 1858 and into spaces between splines on the splined ring 2302. With the locking pawl in this position, rotation of the splined ring 2302 and the steering shaft attached thereto is prevented.

Lost motion provided between the locking pawl and the carrier accommodates a blocked pawl condition. If the pawl 108*f* engages a spline on the splined ring 2302 when the carrier is fully extended, relative movement between the locking pawl 108*f* and the carrier 1816 against the bias of the spring 1818 will place the locking pawl in a cocked position. When the steering shaft is rotated to remove engagement of the spline with the locking pawl 108*f*, the spring 1818 will force the locking pawl outwardly into a space between the splines to lock the steering shaft.

Figure 24:
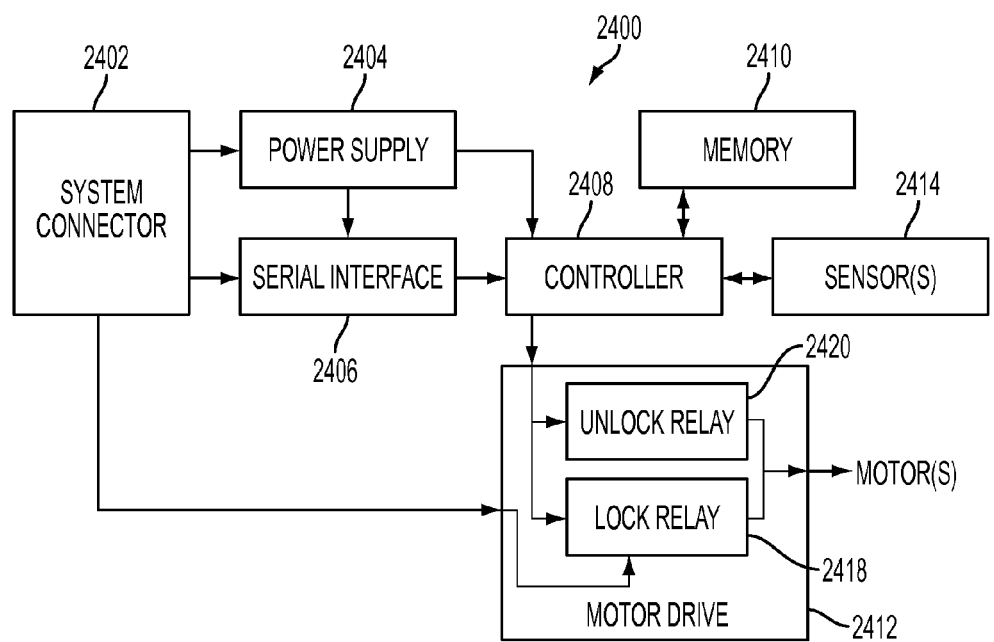
FIG. 24 is a block diagram of another embodiment of an electrical control circuit that may be utilized to control a steering shaft lock actuator consistent with the present disclosure.

FIG. 24 illustrates, in block diagram form, another embodiment 2400 of an electrical control circuit that may be utilized to control a steering shaft lock actuator consistent with the present disclosure. The illustrated exemplary embodiment includes a system connector 2402, a power supply 2404, a serial interface circuit 2406, a controller 2408, memory 2410, and a motor drive 2412. The power supply, serial interface circuit, controller and microcontroller may be provided on a printed circuit board, e.g. printed circuit board 1834, which may be integrated into packaging/housing of the steering lock actuator. One or more of the Hall Effect sensors for sensing the position of the locking pawl may also be disposed on the printed circuit board.

The system connector, e.g. connector 2402, may be any connector interface, e.g. an 8-pin industry standard connector, appropriate for coupling input/output signals to the control circuit 2400. The power supply circuit 2404 may condition an input voltage, e.g. 12V DC, received through the system connector to provide a stable DC supply voltage, e.g. 5V DC, for operating the controller. In one embodiment, the power supply may operate continuously.

The serial interface circuit 2406 may provide an interface for serial data on the vehicle bus to the controller. The serial interface circuit may contain protection circuitry for the vehicle bus. In one embodiment, the serial bus may be configured to turn the power supply on and off through by supplying a wake up or shut down signal to the power supply.

The controller 2408 may include a microcontroller that controls motor drive in response to input signals. Analog inputs to the controller may be used to monitor the electrical conditions of the power pins. Inputs from one or more sensors 2414 may be used to determine the state of the locking pawl, e.g. extended or retracted, and/or other conditions, such as vehicle speed, vehicle door open/closed status, etc., useful in determining whether to drive the actuator into a locked or unlocked state. The sensor(s) 2414 may take any known configuration, e.g. magnetic, mechanical, optical, acoustic, etc, or combinations thereof. Where Hall Effect sensors are used, the sensors may be linear and/or digital Hall Effect sensors. Known two-wire Hall Effect sensors may be used to enable the controller to monitor the sensor output as well as the status of the sensor itself. Other inputs may also be provided to the controller 2408, e.g., a user command to drive the locking pawl 108 toward the locked position, a wirelessly received input from a remote vehicle security system to initiate a lock of the steering shaft when the vehicle is reported stolen, etc.

In response to its inputs, the controller 2408 may provide a control signal to the motor drive circuit 2412. The motor drive circuit may be configured to drive one or more motors in response to the control signal to drive the actuator into a locked (locking pawl extended) or unlocked (locking pawl retracted) state. In one embodiment, high current switching for driving the motor(s) may be performed by two mechanical relays 2418, 2420. A lock relay 2418 may be used for driving the actuator into a locked state and an unlock relay 2420 may be used for driving the actuator into an unlocked state.

In operation, to drive the actuator into an unlocked state an unlock command is received at the system connector from a vehicle control module. In response to the unlock command, the controller may provide, e.g. using appropriate software, hardware and/or firmware, an unlock signal causing the unlock relay 2420 to operate and drive the actuator to an unlocked position. When the sensor inputs indicate the locking pawl is moved to an unlocked position, the unlock relay 2420 may be switched off by a control signal from the controller.

To drive the actuator into a locked state a code message may be received at the system connector and provided to the controller through the serial interface circuit. The controller may be configured, e.g. using appropriate software, hardware and/or firmware, to provide a lock command to the lock relay 2418 only when the coded message is confirmed as being an accurate lock message and when vehicle conditions for locking, e.g. vehicle speed, door status, vehicle power, ignition status, etc. are satisfied as determined from input from the sensor(s). In one embodiment, the conditions for locking may be continuously monitored, e.g. at 1 ms intervals, to ensure the locking conditions are satisfied throughout the locking process. If any locking condition is not satisfied, the locking process may be discontinued.

Power to control the lock relay 2418 and drive the actuator into a locked condition may be provided by an external source through the system connector. A ground return for the locking relay coil may also be supplied through the system connector by an external source. Upon receipt of the lock command, the lock relay 2418 may drive the actuator to a locked state. When sensor(s) output(s) indicate the locking pawl has achieved a locked state, the controller may send a command to the lock relay 2418 to open the relay and turn the motor(s) off. A message may then be sent by the controller to the vehicle control module to indicate the actuator is locked.

Embodiments of the electrical control circuit and method can be implemented as a computer program product for execution by the controller. Such implementations include, without limitation, a series of computer instructions that embody all or part of the functionality previously described herein with respect to the system and method. The series of computer instructions may be stored in any machine-readable medium, such as semiconductor, magnetic, optical or other memory devices, and may be transmitted using any communications technology, such as optical, infrared, microwave, or other transmission technologies. It is expected that such a computer program product may be distributed as a removable machine-readable medium (e.g., a diskette, CD-ROM), preloaded with a computer system (e.g., on system ROM or fixed disk), or distributed from a server or electronic bulletin board over the network (e.g., the Internet or World Wide Web).

Those skilled in the art should appreciate that such computer instructions can be written in a number of programming languages for use with many computer architectures or operating systems. For example, preferred embodiments may be implemented in a procedural programming language (e.g., "C") or an object oriented programming language (e.g., "C++" or Java). Alternative embodiments of the invention may be implemented as pre-programmed hardware elements, firmware or as a combination of hardware, software and firmware.

According to one aspect of the disclosure there is provided a steering shaft lock actuator including at least one motor having an output shaft; a drive train coupled to the output shaft, a locking pawl coupled to the drive train; at least one locking pin coupled to the drive train; and a housing for at least partially enclosing the motor, the drive train, the locking pawl and the locking pin. The drive train may be configured to linearly urge the locking pawl and the at least one locking pin between a locked position wherein the locking pawl and the locking pin extend at least partially out of the housing and unlocked position wherein the locking pawl and the locking pin are retracted toward the housing relative to the locked position. The locking pawl may be positioned to prevent rotational movement of the steering shaft when in the locked position, and the locking pin may be positioned to lock the actuator to a steering shaft interface when in the locked position.

According to another aspect of the disclosure there is provided a steering shaft lock actuator system including: at least one motor having an output shaft; a drive train coupled to the output shaft; a locking pawl coupled to the drive train; at least one locking pin coupled to the drive train; a housing for at least partially enclosing the motor, the drive train, the locking pawl and the locking pin, the housing including a locking pawl guide portion; and a steering shaft interface including an opening for receiving a steering shaft and a receptacle configured for receiving the locking pawl guide portion of the housing. The drive train may be configured to linearly urge the locking pawl and the at least one locking pin between a locked position wherein the locking pawl extends at least partially out of the locking pawl guide portion and the locking pin extends at least partially out of the housing and unlocked position wherein the locking pawl and the locking pin are retracted toward the housing relative to the locked position. The locking pawl may be positioned adjacent the opening to prevent rotational movement of the steering shaft when in the locked position, and the locking pin may be positioned adjacent the receptacle opening to interfere with the steering shaft interface and lock the actuator to the steering shaft interface when in the locked position.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. In addition, various features of the embodiments described herein may be combined or substituted with features of one or more of the other embodiments described herein. Other modifications, variations, and alternatives are also possible. Accordingly, the claims are intended to cover all such equivalents.

What is claimed is:

1. A steering shaft lock actuator system comprising:
    a steering shaft lock actuator comprising:
        at least one motor having an output shaft;
        a drive train coupled to said output shaft;
        a locking pawl coupled to said drive train;
        at least one locking pin coupled to said drive train; and
        a housing for at least partially enclosing said at least one motor, said drive train, said locking pawl and said at least one locking pin, said housing comprising a locking pawl guide portion, and
    a steering shaft interface comprising an opening for receiving a steering shaft and a receptacle opening configured for receiving said locking pawl guide portion of said housing;
    said drive train being configured to linearly urge said locking pawl and said at least one locking pin between a locked position wherein said locking pawl and said at least one locking pin extend at least partially out of said housing, and an unlocked position wherein said locking pawl and said at least one locking pin are retracted toward said housing relative to said locked position,
    said locking pawl being positioned to prevent rotational movement of said steering shaft when in said locked position, and
    said at least one locking pin being positioned to lock said actuator to said steering shaft interface when in said locked position.

2. The steering shaft lock actuator system of claim 1, wherein said drive train comprises a carrier and a spring, and wherein said locking pawl is coupled to said carrier with said spring biasing said locking pawl toward said locked position.

3. The steering shaft lock actuator system of claim 1, wherein said at least one locking pin is coupled to a carrier.

4. The steering shaft lock actuator system of claim 1, wherein said at least one locking pin comprise a portion of a carrier.

5. The steering shaft lock actuator system of claim 1, wherein said locking pawl is coupled to said drive train through a lever pivotable about a pivot point.

6. The steering shaft lock actuator system of claim 5, wherein said at least one locking pin is coupled to said drive train through said lever.

7. The steering shaft lock actuator system of claim 1, wherein said locking pawl further has a cocked position when said locking pawl encounters an obstruction, and wherein a spring is configured to drive said locking pawl into said locked position when said obstruction is removed.

8. The steering shaft lock actuator system of claim 1, wherein said housing comprises at least one fixed feature extending from a surface thereof and positioned to engage a corresponding mating feature of said steering shaft interface.

9. A steering shaft lock actuator system comprising:
    a steering shaft lock actuator comprising:
        at least one motor having an output shaft;
        a drive train coupled to said output shaft;
        a locking pawl coupled to said drive train;
        at least one locking pin coupled to said drive train; and
        a housing for at least partially enclosing said at least one motor, said drive train, said locking pawl and said at least one locking pin, said housing comprising a locking pawl guide portion; and
    a steering shaft interface comprising an opening for receiving a steering shaft and a receptacle opening configured for receiving said locking pawl guide portion of said housing,
    said drive train being configured to linearly urge said locking pawl and said at least one locking pin between a locked position wherein said locking pawl extends at least partially out of said locking pawl guide portion and said at least one locking pin extends at least partially out of said housing, and an unlocked position wherein said locking pawl and said at least one locking pin are retracted toward said housing relative to said locked position,
    said locking pawl being positioned adjacent said opening to prevent rotational movement of said steering shaft when in said locked position, and
    said at least one locking pin being positioned adjacent said receptacle opening to interfere with said steering shaft interface and lock said steering shaft lock actuator to said steering shaft interface when in said locked position.

10. The system of claim 9, wherein said drive train comprises a carrier and a spring, and wherein said locking pawl is coupled to said carrier with said spring biasing said locking pawl toward said locked position.

11. The system of claim 9, wherein said at least one locking pin is coupled to a carrier.

12. The system of claim 9, wherein said at least one locking pin comprise a portion of a carrier.

13. The system of claim 9, wherein said locking pawl is coupled to said drive train through a lever pivotable about a pivot point.

14. The system of claim 13, wherein said at least one locking pin is coupled to said drive train through said lever.

15. The system of claim 9, wherein said locking pawl further has a cocked position when said locking pawl encounters an obstruction, and wherein a spring is configured to drive said locking pawl into said locked position when said obstruction is removed.

16. The system of claim 9, wherein said housing comprises at least one fixed feature extending from a surface thereof and positioned to engage a corresponding mating feature of said steering shaft interface.

17. A system comprising:

a vehicle steering shaft; and a steering shaft lock actuator comprising:

at least one motor having an output shaft, a drive train coupled to said output shaft, a locking pawl coupled to said drive train, at least one locking pin coupled to said drive train, and a housing for at least partially enclosing said at least one motor, said drive train, said locking pawl and said at least one locking pin, said housing comprising a locking pawl guide portion, and a steering shaft interface comprising an opening for receiving said steering shaft and a receptacle opening configured for receiving said locking pawl guide portion of said housing, said drive train being configured to linearly urge said locking pawl and said at least one locking pin between a locked position wherein said locking pawl extends at least partially out of said locking pawl guide portion and said at least one locking pin extends at least partially out of said housing and unlocked position wherein said locking pawl and said at least one locking pin are retracted toward said housing relative to said locked position, said locking pawl being positioned adjacent said opening to prevent rotational movement of said steering shaft when in said locked position, and said at least one locking pin being positioned adjacent said receptacle opening to interfere with said steering shaft interface and lock said steering shaft lock actuator to said steering shaft interface when in said locked position.

18. The system of claim 17, wherein said drive train comprises a carrier and a spring, and wherein said locking pawl is coupled to said carrier with said spring biasing said locking pawl toward said locked position.

19. The system of claim 17, wherein said at least one locking pin is coupled to a carrier.

20. The system of claim 17, wherein said housing comprises at least one fixed feature extending from a surface thereof and positioned to engage a corresponding mating feature of said steering shaft interface.

\* \* \* \* \*